Aug. 12, 1941.                L. P. ANTHONY                2,252,153
                        INTERNAL COMBUSTION ENGINE
                            Filed June 17, 1940
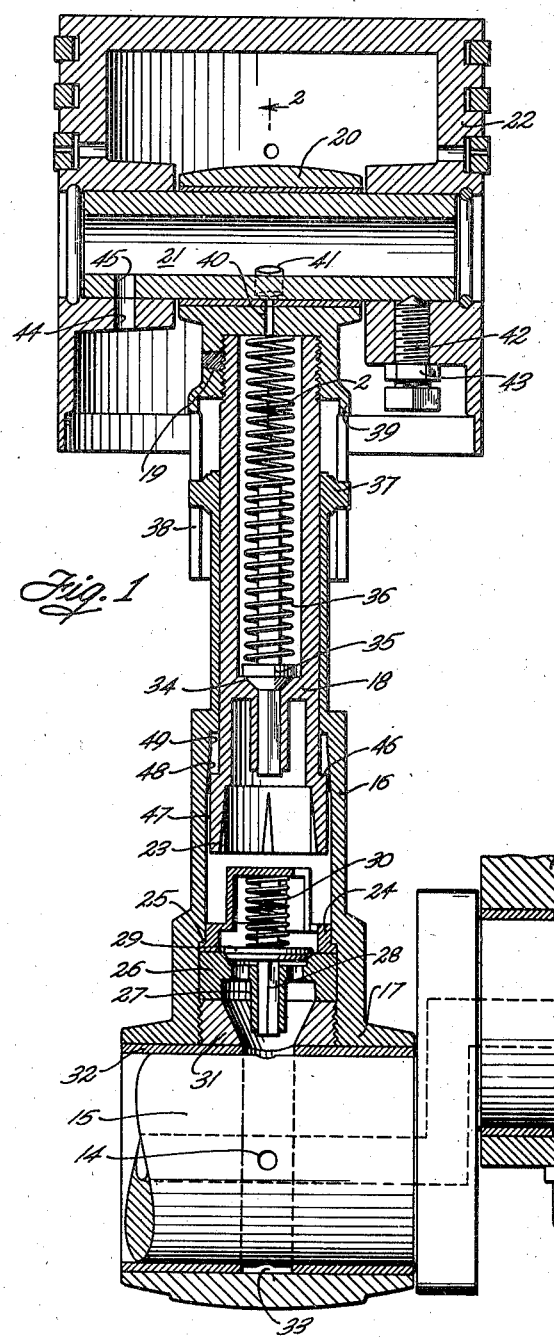
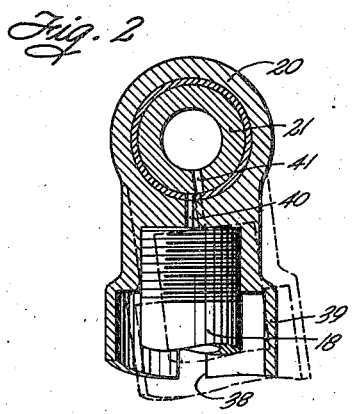
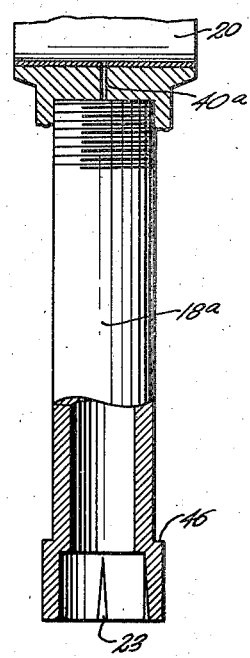
Inventor
LEON P. ANTHONY
By Hazard and Miller
Attorneys Patented Aug. 12, 1941

2,252,153

UNITED STATES PATENT OFFICE 2,252,153

INTERNAL COMBUSTION ENGINE

Leon P. Anthony, Los Angeles, Calif., assignor of one-half to Mary Adeline Reynolds, Los Angeles, Calif.

Application June 17, 1940, Serial No. 340,862

11 Claims. (Cl. 123—78)

This invention relates to improvements in internal combustion engines and may be considered as an improvement over the disclosures made in my copending applications Serial No. 229,868 filed September 14, 1938, and Serial No. 331,987, filed April 27, 1940.

In the above-mentioned applications I have disclosed an internal combustion engine having a telescopic connecting rod connecting the crankshaft with the piston. A fluid such as oil is supplied through the crankshaft to the interior of the connecting rod, and is entrapped in the connecting rod to hold or lock it against collapse during downward strokes of the piston. On upward strokes of the piston egress from the interior of the connecting rod is permissible to enable the connecting rod to adjust itself as to length commensurate with the charge of fuel taken into the cylinder of the engine whereby, when the engine is operating at any given speed the compression in the cylinder will remain substantially constant regardless of the degree of throttle opening. In this manner, fuels which would otherwise be in danger of preigniting when used in a conventional engine operating at low speed but with a wide throttle opening, can be used without danger of preignition due to the fact that the compression in the cylinder does not vary with the throttle opening, or with the quantity of charge taken into the cylinder.

In the disclosures made in the above-mentioned applications, the crankshaft is equipped with a cam which serves to open a valve to permit egress from the telescopic connecting rod during upward strokes of the piston, and the fluid or oil that is caused to be expelled from the connecting rod is returned to the crankshaft. When a cam is used on the crankshaft to open the valve to permit egress, a special construction of crankshaft is required.

It is an object of the present invention to provide an improved internal combustion engine wherein the effective length of the connecting rod may be varied to adjust itself for various charges of fuel taken into the cylinder, which does not require a special construction of crankshaft or a cam on the crankshaft which will open the connecting rod to permit egress therefrom on upward strokes of the piston. In this way the present invention may be incorporated in an engine having a conventional construction of crankshaft, without requiring modification or alteration of the crankshaft.

Another object of the invention is to provide a highly simplified form of construction, wherein the number of necessary parts and particularly the number of moving parts, is materially reduced.

Still a further object of the invention is to provide an engine having a telescopic connecting rod supplied with oil under pressure from the crankshaft, wherein the expelled oil instead of being returned to the crankshaft is expelled from adjacent the top of the connecting rod and returned to the crankcase. In this way oil is taken into the connecting rod from the crankshaft and progresses through the connecting rod until ultimately expelled, with the result that the oil in the connecting rod is being constantly replaced with fresh oil.

With the foregoing and other objects in view, which will be made manifest in the following detailed description and specifically pointed out in the appended claims, reference is had to the accompanying drawing for an illustrative embodiment of the invention wherein:

Figure 1 is a vertical section through a piston and through the telescopic connecting rod embodying the present invention which is illustrated as connected to a portion of a crankshaft;

Fig. 2 is a sectional view taken substantially upon the line 2—2 upon Fig. 1, the dotted lines indicating the position of the connecting rod with respect to the wrist pin of the piston during an upward stroke of the piston; and Fig. 3 is a view in side elevation, parts being broken away and shown in vertical section illustrating a slightly modified form which may be optionally employed of the inner telescopic member of the connecting rod.

Referring to the accompanying drawing wherein similar reference characters designate similar parts throughout, 10 indicates a main bearing of an engine for the crankshaft 11. The crankshaft may be of any conventional or preferred design, but in accordance with present common practice it should be supplied with oil under substantially constant pressure through a tube 12 from an oil pump, not shown. The oil supplied under pressure through tube 12 finds ingress to the hollow interior of the crankshaft through ports 13, and is delivered to outlet ports 14 in the crank pins, one of which is illustrated at 15.

The improved connecting rod comprises an outer telescopic member 16 preferably, but not necessarily, formed integral with the body 17 of the crank pin bearing. Within this outer telescopic member there is disposed an inner telescopic member 18, which has its upper end threadedly connected and preferably welded as indicated at 19 or otherwise permanently secured to the wrist pin bearing 20, which surrounds the wrist pin 21 of the piston 22. The inner telescopic member 18 is designed to be inserted through the lower end of the outer telescopic member 16 when the cap of bearing 17 is removed. Suitable kerfs 23 are formed in its lower end, to enable the application of a suitable wrench for screwing the upper end of the inner telescopic member into the wrist pin bearing. When tightened in place small welds 19 may be formed in apertures in the sides of the wrist pin bearing, to permanently fasten the inner telescopic member thereto.

Following the insertion of the inner telescopic member a cage 24 is inserted into the outer telescopic member 16, which is held against a shoulder 25 by means of a valve seat 26. The valve seat provides a guide 27 for the stem 28 of a check valve 29, urged into closed position by a compression spring 30 compressed between the cage 24 and the top of the valve. The valve seat 26 is held in position by means of a nut 31, screwed into the bottom of the outer telescopic member 16.

It is preferable to assemble the parts above described prior to finishing the interior of bearing 17, so that on finishing the interior of the bearing the bottom of the nut 31 will be simultaneously finished flush with the interior of the bearing.

The bearing insert 32 is then inserted into the bearing in the form of inserts, and serves to lock the nut 31 in place. In this bearing metal there is formed a channel or annular groove 33, which receives the oil from the outlet ports 14; and conveys it through nut 31 to the underside of the check valve 29.

Within the inner telescopic member there is formed a valve seat 34, for a valve 35, urged into closed position by means of a spring 36. The outer telescopic member 16 has adjacent its top diametrically opposed bosses 37, slidable in slots 38 in a skirt 39, formed integral with or attached to the wrist pin bearing 20. These bosses which are slidable in the slots 38, merely provide a form of splined or keyed connection holding the wrist pin bearing 20 in parallel relationship with the crank pin 15, regardless of the lengthening or shortening of the connecting rod.

In the bottom of the wrist pin bearing 20 there is formed an outlet aperture 40, which can be moved into or out of registration with an aperture 41 formed in the wrist pin 21. The wrist pin 21 is locked against rotation within the piston by means of a set screw 42, which may be equipped with a jamb nut 43. In the preferred form of construction registering apertures 44 and 45 are formed in a wrist pin boss of the piston 22 and in the wrist pin 21 adjacent the end thereof. It will be noted that the bottom of the inner telescopic member 18, is enlarged forming a shoulder 46. Adjacent this enlargement a subtantial clearance 47 is present between the bottom of the inner telescopic member and the interior of the outer telescopic member 16. However, immediately thereabove the interior of the outer telescopic member is tapered as at 48 to a cylindrical surface 49, which closely fits the exterior of the enlarged bottom of the inner telescopic member 18.

The operation and advantages of the improved internal combustion engine are as follows. Oil is continuously supplied at substantially constant pressure to the interior of the crankshaft from the oil pump, not shown, through tubing 12. From the interior of the crankshaft the oil is conveyed to the underside of check valve 29. Whenever the oil pressure on the underside of check valve 29 is in excess of the oil pressure within the telescopic connecting rod the check valve opens, to substantially equalize the pressure between the crankshaft and the connecting rod. Aperture 41 is so arranged in the wrist pin 21, that it will be closed by aperture 40 when the crankshaft is approximately 10° in advance of its dead center position with the piston at the top of its stroke. It remains closed throughout the downward stroke of the piston, until the crankshaft has reached a position approximately 10° beyond the dead center position at the bottom of the piston stroke. During the upward stroke the connecting rod assumes a position approaching that illustrated in dotted lines on Fig. 2, so that during the major portion of the upward stroke aperture 41 is opened by aperture 40, to afford egress from the interior of the telescopic connecting rod. Consequently, if the engine is operating at low speed with a small throttle opening causing only a small charge of fuel to be taken into the cylinder, the oil pressure conveyed to the interior of the telescopic connecting rod serves to expand or lengthen the connecting rod, with the result that under these conditions the piston at the top of its stroke moves quite high in the cylinder, maintaining a predetermined compression in the cylinder even though the fuel charge taken therein is small. The degree of compression maintained in the cylinder under these conditions, depends upon or is commensurate with the strength of spring 36, and the force with which it urges valve 35 to close. The strength of this spring will of course have to be varied with the degree of compression that it is desired to maintain in the cylinder.

If, when the engine is operating at low speed the throttle is opened considerably, so as to take into the cylinder a much larger volumetric charge of fuel, on the compression stroke of the piston, apertures 40 and 41 are open, and oil may find egress therethrough permitting the telescopic connecting rod to effectively shorten, and thus lower the position of the piston when at the top of its stroke, so as to keep the compression in the cylinder substantially the same even though a larger charge of fuel is taken therein. During the explosion or power strokes it will be noted that the outlet from the connecting rod is closed, and as oil in the connecting rod cannot escape therefrom during the downward stroke and the oil is substantially incompressible, the connecting rod is effectively locked against collapse transmitting the forces imposed on the piston by the exploding fuel to the crank pin 15. In this form of construction it will be appreciated that the wrist pin aperture 41 and the wrist pin bearing aperture 40 form a type of rotary valve, which is gradually or slowly closed as the piston reaches the top of its stroke. The slow closing of this valve is advantageous, in that when the telescopic connecting rod is locked or closed against egress of oil therefrom no sudden locking takes place, and there consequently is no severe strain placed on the parts or any tendency to knock on the closing of the connecting rod. The arrangement is such also that if any wear should take place between the wrist pin bearing 20 and the wrist pin, the effect of the explosion on the top of the piston is such as to force the wrist pin tightly against the bottom of the wrist pin bearing, and thus maintain the valve tight during the power stroke. It will be appreciated that during the power stroke it is important to prevent leakage from the connecting rod.

When the engine is operating at high speeds, the length of time that aperture 40 is open is reduced for each cycle of operation. While this aperture is sufficiently large to adequately convey oil therethrough when the engine is under slow speed, at high speeds the size of the aperture together with the short period of opening causes the aperture to serve somewhat as a choke, retarding the ready flow of oil through this outlet. The oil thus being retarded or to some extent kept within the telescopic member, I observe under these conditions a material increase in compression. That is, the compression in the cylinder when the engine is operating at high speed, is materially increased over that existing in the cylinder when the engine is operating at low speed. However, under any given set of speed conditions, the compression is substantially the same regardless of whether the throttle is open or nearly closed. The increase in compression at high speeds is unobjectionable for the reason that when the engine is operating at high speed there is little danger of the fuel preigniting, and burning before the piston starts upon its down or working stroke. Under most conditions the increase in compression during high speed is not only unobjectionable but highly desirable, because of the additional power that can be derived.

If desired, the spring 36 and the valve 35 may be omitted entirely. I have illustrated the modified form of construction in Fig. 3, wherein the inner telescopic member 18a is not equipped with any valve seat corresponding to valve seat 34, and does not contain any valve 35 or any spring 36. In this form of construction the aperture 40a corresponds to aperture 40, except that it is materially smaller in size, so that even at comparatively low speeds this orifice on account of its size will have a choking or retarding effect upon the oil that is expelled therethrough. In this form of construction as above explained, there is a highly noticeable increase in compression in the cylinder when the engine is operating at high speeds over the compression that exists in the cylinder at low speeds.

When the engine is operating at high speeds, the inertia or momentum of the piston as it approaches the top of its stroke is such as to tend to cause the pulling apart of the telescopic connecting rod. To prevent the external shoulder adjacent the bottom of the inner telescopic member 18 engaging the opposed shoulder on the interior of the outer telescopic member 16 the shoulder 46 on passing by the taper 48 and entering the closely fitting cylindrical surface 49, serves to entrap a small amount of oil in this space. This oil acts somewhat as a liquid cushion, preventing direct metal-to-metal contact between these shoulders and prevents separating movement of the inner and outer telescopic members 18 and 16, so that no shoulder-to-shoulder contact is possible. Normally the enlarged portion at the bottom of the iner telescopic member 18 fluctuates up and down below the bottom of the cylindrical surface 49.

From the above-described construction it will be appreciated that the invention has a relatively small number of parts, and that the number of moving parts is materially reduced. Furthermore, it may be incorporated in an engine or installed on an engine crankshaft that conforms to conventional design, in that no special cam is required to be formed or provided on the crankshaft. The opening of the outlet from the telescoping connecting rod is positively accomplished as a function of the angular relationship of the connecting rod to the piston 22. By the use of the rotary type valve for egress, the closing or locking up of the connecting rod is gradually rather than suddenly accomplished, so that no sudden jar is imposed on the locking of the connecting rod near the start of the power stroke.

Various changes may be made in the details of construction without departing from the spirit or scope of the invention as defined by the appended claims.

I claim:

1. In an internal combustion engine, a crankshaft and a piston, a telescopic connecting rod connecting the crankshaft with the wrist pin of the piston, means for supplying oil under pressure through the crankshaft to the interior of the telescopic connecting rod, means for entrapping the oil therein to resist collapse or shortening of the connecting rod during downward strokes of the piston, and means for opening the telescopic connecting rod for egress therefrom through the wrist pin of the piston during upward strokes of the piston.

2. In an internal combustion engine, a crankshaft and a piston, a telescopic connecting rod connecting the crankshaft with the wrist pin of the piston, means for supplying oil under pressure through the crankshaft to the interior of the telescopic connecting rod, means for entrapping the oil therein to resist collapse or shortening of the connecting rod during downward strokes of the piston, there being an outlet at the top of the telescopic connecting rod adapted to be opened and closed in accordance with the angular relation of the connecting rod to the piston.

3. In an internal combustion engine, a crankshaft and a piston, a telescopic connecting rod connecting the crankshaft with the wrist pin of the piston, means for supplying oil under pressure through the crankshaft to the interior of the telescopic connecting rod, means for entrapping the oil therein to resist collapse or shortening of the connecting rod during downward strokes of the piston, means for opening the telescopic connecting rod for egress therefrom through the wrist pin of the piston during upward strokes of the piston, and means for regulating the flow through the outlet when the outlet is open.

4. In an internal combustion engine, a crankshaft and a piston, a telescopic connecting rod, means for supplying oil under pressure through the crankshaft to the interior of the telescopic connecting rod, a check valve preventing return flow from the connecting rod to the crankshaft, and means permitting egress from the connecting rod through the wrist pin of the piston only during upward strokes of the piston.

5. In an internal combustion engine, a crankshaft and a piston, a telescopic connecting rod, means for supplying oil under pressure through the crankshaft to the interior of the telescopic connecting rod, a check valve preventing return flow from the connecting rod to the crankshaft, means permitting egress from the connecting rod through the wrist pin of the piston only during upward strokes of the piston, and means regulating the rate of flow through the connecting rod when egress is permitted.

6. In an internal combustion engine, a crankshaft and a piston, a telescopic connecting rod, means for supplying oil under pressure through the crankshaft to the interior of the telescopic connecting rod, a check valve preventing return flow from the connecting rod to the crankshaft, means permitting egress from the connecting rod through the wrist pin of the piston only during upward strokes of the piston, and means regulating the rate of flow through the connecting rod when egress is permitted, comprising a spring-closed valve.

7. In an internal combustion engine, a crankshaft and a piston, a telescopic connecting rod, means for supplying oil under pressure through the crankshaft to the interior of the telescopic connecting rod, a check valve preventing return flow from the connecting rod to the crankshaft, means permitting egress from the connecting rod through the wrist pin of the piston only during upward strokes of the piston, and means regulating the rate of flow through the connecting rod when egress is permitted, comprising a restricted orifice.

8. In an internal combustion engine, a crankshaft and a piston, a telescopic connecting rod connecting the crankshaft with the wrist pin of the piston, means for supplying oil under pressure through the crankshaft to the interior of the telescopic connecting rod, means for entrapping the oil therein to resist collapse or shortening of the connecting rod during downward strokes of the piston, and means providing a rotary type valve for opening the telescopic connecting rod for egress therefrom during upward strokes of the piston.

9. In an internal combustion engine, a crankshaft and a piston, a telescopic connecting rod connecting the crankshaft with the wrist pin of the piston, means for supplying oil under pressure through the crankshaft to the interior of the telescopic connecting rod, means for entrapping the oil therein to resist collapse or shortening of the connecting rod during downward strokes of the piston, and means providing a rotary type valve, a part of which is formed by the wrist pin of the piston for opening the telescopic connecting rod for egress therefrom during upward strokes of the piston.

10. In an internal combustion engine, a crankshaft and a piston, a telescopic connecting rod, means for supplying oil under pressure through the crankshaft to the interior of the telescopic connecting rod, a check valve preventing return flow from the connecting rod to the crankshaft, and means providing a rotary type valve for opening the telescopic connecting rod for egress therefrom during upward strokes of the piston.

11. In an internal combustion engine, a crankshaft and a piston, a telescopic connecting rod, means for supplying oil under pressure through the crankshaft to the interior of the telescopic connecting rod, a check valve preventing return flow from the connecting rod to the crankshaft, and means providing a rotary type valve, a part of which is formed by the wrist pin of the piston for opening the telescopic connecting rod for egress therefrom only during upward strokes of the piston.

LEON P. ANTHONY.